United States Patent [19]

Grotzinger et al.

[11] Patent Number: 4,959,827
[45] Date of Patent: Sep. 25, 1990

[54] LASER SIGNAL MIXER CIRCUIT

[75] Inventors: Timothy L. Grotzinger, Manheim; Herbert A. Frederiksen, Mountville, both of Pa.

[73] Assignee: Laser Communications, Inc., Lancaster, Pa.

[21] Appl. No.: 331,253

[22] Filed: Mar. 30, 1989

[51] Int. Cl.[5] .............................. H04B 9/00
[52] U.S. Cl. .......................... 370/3; 370/1; 455/609; 455/611; 358/226; 358/142
[58] Field of Search ................. 370/3, 1, 4; 455/600, 455/609, 611, 615, 617; 358/226, 343, 141, 142, 200, 901

[56] References Cited

U.S. PATENT DOCUMENTS

| | | | |
|---|---|---|---|
| 2,284,706 | 6/1942 | Wiessner | 370/120 |
| 3,727,185 | 4/1973 | Jones | 340/147 |
| 3,733,438 | 5/1973 | Haley | 370/120 |
| 3,917,906 | 11/1975 | Johnson | 370/120 |
| 4,054,794 | 10/1977 | Laughlin | 370/3 |
| 4,061,577 | 12/1977 | Bell | 370/3 |
| 4,689,826 | 8/1987 | Smith | 455/613 |
| 4,700,352 | 10/1987 | Shikada | 455/609 |
| 4,723,310 | 2/1988 | DeCorlieu et al. | 455/611 |

Primary Examiner—Donnie L. Crosland
Attorney, Agent, or Firm—Martin Fruitman

[57] ABSTRACT

A circuit for mixing audio, video and data signals for transmission by laser link. The data signal is first modulated by frequency shift keying and then, after passing through a bandpass filter, is mixed with the audio signal and then frequency modulated at about 12 MHz. The combined signal is then mixed with the 70 MHz frequency modulated video signal, but each signal is isolated from the mixed signal by an appropriate filter so that each signal is not fed to the other source.

4 Claims, 2 Drawing Sheets

4,959,827

LASER SIGNAL MIXER CIRCUIT

SUMMARY OF THE INVENTION

This invention deals generally with telecommunications and more specifically with multiplexing signals for transmission by a laser beam.

Laser beam transmission of information is becoming more common, and as it does, greater demands are being placed upon it. The large bandwidth of laser communications, by its very nature tempts the user to put more and more information on the beam. One typical application of laser beam communication is for short range links between nearby buildings, for instance, on a college campus, but it is wasteful of facilities to use the laser link for computer data while running cables for telephone communications. It is also wasteful and expensive to use separate laser links for each different type of information.

The present invention solves this problem by multiplexing three vastly different forms of information in a manner which permits their use in a laser communications link. This is accomplished for data, video and audio transmissions essentially by isolating the three sources with filters and modulating the data signal by frequency shift keying before adding the audio and modulating the combination again.

At the laser beam transmitter, the video signal input is conventionally modulated and fed into a 70 MHz bandpass filter the output of which is connected directly to the laser drive circuit.

The data input signal is first frequency shift key modulated and fed into a bandpass filter before mixing it with the audio input signal. The combined audio signal and modulated data signal are then used to FM modulate a 12 MHz carrier and the combined modulated signals are mixed with the modulated video signal at the input of the laser drive circuit.

The two signals at the laser drive are essentially a high frequency, 70 MHz, and a lower frequency, 12 MHz, and the filters in the earlier stages of the signal paths prevent each signal from affecting the other source.

At the laser beam receiver, the photodetector output signal is processed by several bandpass filters to separate out the three information signals.

The photodetector signal is fed directly to a 70 MHz bandpass filter and a 12 MHz bandpass filter. The 70 MHz filter feeds the video demodulator which sends the separated video signal out through an amplifier. The 12 MHz filter feeds its output signal to a demodulator which feeds both an audio bandpass filter and a 120 KHz-200 KHz bandpass filter.

The audio bandpass filter output supplies the separated audio signal.

The 120 KHz to 200 KHz filter feeds a frequency shift key demodulator which then supplies the separated data signal from its output.

Thus, the three independent signals which were fed into the laser transmitter are reestablished again on the output of the laser receiver as separate and independent signals, accomplishing the transmission of three different information links with one laser. The particular placement of the several filters of the circuit prevents any one signal from affecting the others, and each signal is faithfully transmitted regardless of whether the others are present.

DETAILED DESCRIPTION OF THE INVENTION

Figure 2:
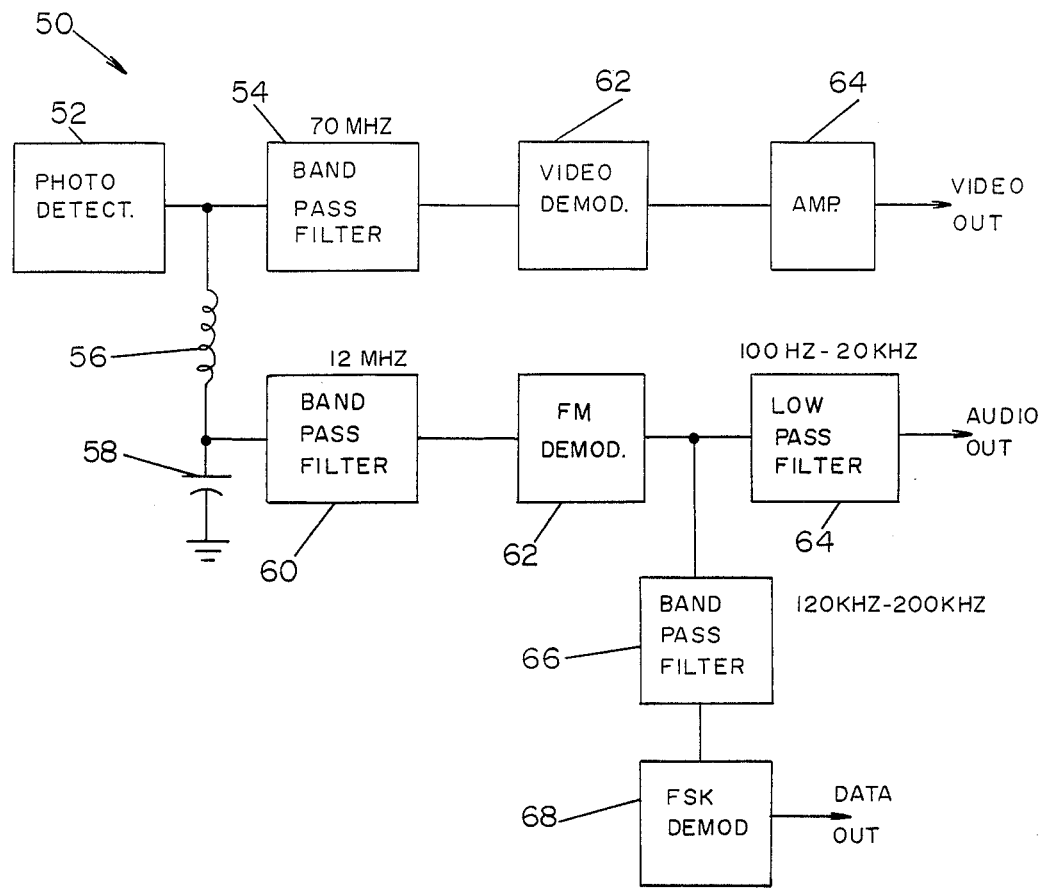
FIG. 2 is a simplified functional block diagram of the preferred embodiment of the multiple signal laser beam receiver.

The preferred embodiment of the invention is shown in FIG. and FIG. 2 which are functional block diagrams of the laser transmitter and receiver, respectively.

Figure 1:
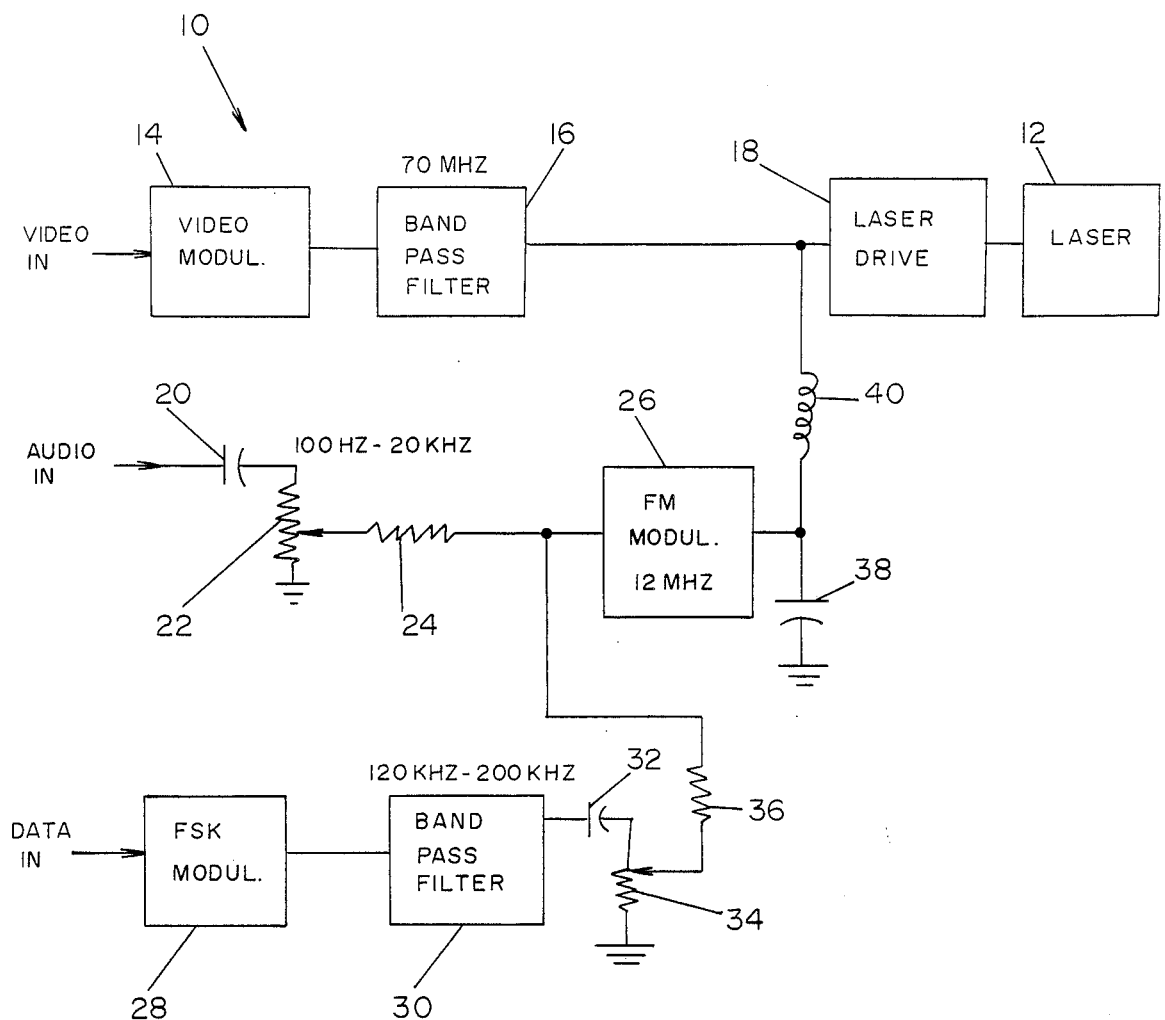
FIG. 1 is a simplified functional block diagram of the preferred embodiment of the multiple signal laser beam transmitter.

As shown in FIG. 1, the particular arrangement of filters and modulators in transmitter 10 permits the simultaneous transmission of video, audio and data signals by laser 12.

The video signal is first fed into conventional video modulator 14 from which it is fed to bandpass filter 16 which is centered on the video carrier frequency of approximately 70 MHz. The output from bandpass filter 16 is fed directly to laser drive circuit 18 which operates laser 12.

The audio input signal is first fed through capacitor 20 to amplitude adjustment potentiometer 22 and through isolation resistor 24 to conventional FM modulator 26 which modulates its input signal onto a 12 MHz carrier in a conventional fashion.

The data input is first processed by frequency shift key (FSK) modulator 28 from which it is fed to bandpass filter 30. Bandpass filter 30 has a pass band of approximately 120 KHz to 200 KHz and operates in both directions so that the audio signal can not feed back to FSK modulator 28. The output of bandpass filter 30 is fed to capacitor 32 and potentiometer 34 so that the signal amplitude may be adjusted. The data signal is then fed to the input of FM modulator 26 through isolation resistor 36 where it is mixed with the audio signal.

The audio signal which, at 100 Hz to 20 KHz, is a much lower frequency than the data signal with which it has been mixed, and the data signal together modulate the 12 MHz carrier of FM modulator 26.

The output of FM modulator 26, with its carrier frequency of 12 MHz, is fed to laser drive 18 through capacitor 38 and choke 40 which together form a low pass filter that prevents the 70 MHz video signal from feeding back into FM modulator 26.

At laser drive 18 the two input signals, the video at 70 MHz and the combined audio and data at 12 MHz, are distinct and separate enough to prevent each from affecting the other.

Laser beam 12 therefore transmits all three signals to laser receiver 50 in the form of combined 70 MHz and 12 MHz signals.

As shown in FIG. 2 laser receiver 50 receives the light beam at photodetector 52 which conventionally converts the light to an electrical signal similar to that delivered to laser drive circuit 18 at the transmitter, that is, a signal modulated with 12 MHz and 70 MHz. This signal is delivered directly to bandpass filter 54 which has a center frequency of 70 MHz and, through a low pass filter formed from choke 56 and capacitor 58, to bandpass filter 60 which has a center frequency of 12 MHz. The signal is thereby separated into its 70 MHz video and 12 MHz audio and data components.

The video component is fed from the output of bandpass filter 54 to conventional video demodulator 62 from which it is fed to conventional amplifier 64 and to a typical video distribution system or display (not shown).

The audio and data signal is processed by bandpass filter 60 which has a center frequency of approximately 12 MHz and is fed to conventional FM demodulator 62 to produce a signal with two distinct frequencies, one in the audio band of 100 Hz to 20 KHz and the other in a higher band of 120 KHz to 200 KHz.

While the frequencies in the preferred embodiment are only examples, it is desirable that the higher frequency band of two frequencies being separated start at least at three times the frequency of the highest frequency of the lower band in order to properly isolate the two bands. Both the 12 MHz to 70 MHz ratio and the 20 KHz to 120 KHz ratio easily meet this requirement.

Although both the audio frequencies and the data frequencies are available on the input of low pass filter 64 and bandpass filter 66, the operating characteristics of each filter permit only the appropriate signal to pass through.

Low pass filter 64 with an upper limit of approximately 20 KHz permits only audio frequencies to pass through and to be delivered to an audio distribution system (not shown).

Bandpass filter 66 permits only the data signal to pass through and feeds it to frequency shift key demodulator 68 which then feeds the original data information signal to a data distribution system (not shown). During its transmission and reception, the data signal is modulated twice and demodulated twice. It is first frequency shift key modulated and then frequency modulated for transmission, and then demodulated in reverse order at the receiver. It is this sequence which permits its combination first with audio signal and then with video so they may be transmitted simultaneously by the laser beam.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims. For instance, the specific frequencies of each signal could be varied and the filters could be either active or passive types. Moreover, bandpass filter 60 in receiver 50 can be omitted in some applications.

What is claimed as new and for which Letters Patent of the United States are desired to be secured is:

1. A method of simultaneously transmitting and receiving video, audio and data signals with a laser beam link which comprises:
   modulating an input video signal and passing it through a first bandpass filter after modulation;
   frequency shift key modulating an input data signal and passing it through a second bandpass filter whose lowest pass frequency is at least three times the highest audio frequency;
   combining an input audio frequency signal with the frequency shift key modulated and filtered data signal;
   frequency modulating the combined audio frequency signal and data signal and passing it through a first low pass filter whose pass frequency is no more than one-third of the frequency of the modulated and filtered video signal;
   combining the video signal with the combined audio frequency and data signals and feeding the combined three frequencies to a laser drive circuit which causes the combined frequencies to be transmitted on a laser beam;
   receiving the laser beam on a photodetector which converts the light beam to an electrical output signal similar to the signal fed to the laser drive circuit;
   feeding the photodetector output signal to a third bandpass filter of approximately the same characteristics as the first bandpass filter and to a second low pass filter with approximately the same characteristics as the first low pass filter;
   demodulating the output of the third bandpass filter to yield a signal similar to the input video signal;
   feeding the output of the second low pass filter to an FM demodulator to produce a demodulated signal combining the original input data signal and input audio frequency signal;
   feeding the demodulated signal to a third low pass filter which yields only a signal similar to the input audio frequency signal;
   feeding the demodulated signal to a fourth bandpass filter with approximately the same characteristics as the second bandpass filter; and
   frequency shift key demodulating the output of the fourth bandpass filter to yield a signal similar to the input data signal.

2. The method of claim I further including filtering the output of the second low pass filter through a filter bandpass filter before feeding it to the FM demodulator, the fifth bandpass filter having a center frequency no more than one-third the frequency of the third bandpass filter.

3. A circuit for simultaneously transmitting and receiving video, audio and data signals with a laser beam link which comprises:
   a first modulator acting upon an input video signal;
   a first bandpass filter receiving signal from the first modulator;
   a frequency shift key modulator acting upon an input data signal;
   a second bandpass filter receiving signal from the frequency shift key modulator, the second bandpass filter having a lowest pass frequency at least three times the highest audio frequency;
   a first mixer circuit receiving and combining an input audio frequency signal and the data signal from the second bandpass filter;
   an FM modulator receiving and acting upon the combined audio frequency signal and data signal from the first mixer circuit;
   a first low pass filter, whose pass frequency is no more than one-third of the frequency of modulated and filtered video signal, receiving the combined audio frequency signal and data signal from the FM modulator,
   a second mixer circuit receiving and combining the video signal from the first bandpass filter and the combined audio frequency signal and data signal from the first low pass filter;
   a laser drive circuit receiving and acting upon the combined video, audio frequency and data signals from the second mixer circuit;
   a laser receiving the signal from the laser drive circuit and transmitting it on a laser beam;

a photodetector receiving the laser beam and converting it to an electrical signal similar to the signal fed to the laser drive circuit;

a third bandpass filter with approximately the same characteristics as the first bandpass filter receiving the signal from the photodetector;

a second low pass filter with approximately the same characteristics as the first low pass filter also receiving the signal from the photodetector;

a video demodulator receiving signal from the third bandpass filter and supplying a signal similar to the input video signal;

an FM demodulator receiving signal from the second low pass filter and producing a demodulated signal combining the original input data signal and input audio frequency signal;

a third low pass filter receiving signal from the FM demodulator and supplying a signal similar to the input audio frequency signal;

a fourth bandpass filter with approximately the same characteristics as the second bandpass filter also receiving signal from the FM demodulator; and a frequency shift key demodulator receiving signal from the fourth bandpass filter and supplying a signal similar to the input data signal.

4. The circuit of claim 3 further including a fifth bandpass filter, with a center frequency no more than one-third the frequency of the third bandpass filter, receiving signal from the second low pass filter and feeding it to the FM demodulator.

* * * * *